US010512062B2

(12) United States Patent
Lee et al.

(10) Patent No.: US 10,512,062 B2
(45) Date of Patent: Dec. 17, 2019

(54) METHOD AND APPARATUS FOR INDICATING D2D RESOURCE POOL IN WIRELESS COMMUNICATION SYSTEM

(71) Applicant: LG ELECTRONICS INC., Seoul (KR)

(72) Inventors: Youngdae Lee, Seoul (KR); Sunghoon Jung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/307,336

(22) PCT Filed: May 6, 2015

(86) PCT No.: PCT/KR2015/004507
§ 371 (c)(1),
(2) Date: Oct. 27, 2016

(87) PCT Pub. No.: WO2015/170871
PCT Pub. Date: Nov. 12, 2015

(65) Prior Publication Data
US 2017/0048822 A1  Feb. 16, 2017

Related U.S. Application Data

(60) Provisional application No. 61/988,923, filed on May 6, 2014.

(51) Int. Cl.
*H04W 72/02* (2009.01)
*H04W 72/04* (2009.01)

(52) U.S. Cl.
CPC ........... *H04W 72/02* (2013.01); *H04W 72/04* (2013.01)

(58) Field of Classification Search
CPC ........ H04W 72/02; H04W 72/04; H04L 5/006
See application file for complete search history.

(56) References Cited

U.S. PATENT DOCUMENTS

| 2013/0109301 A1 | 5/2013 | Hakola et al. |
| 2014/0023008 A1* | 1/2014 | Ahn ................. H04L 5/006 370/329 |

(Continued)

FOREIGN PATENT DOCUMENTS

| CN | 103636177 | 3/2014 |
| WO | 2012/159270 | 11/2012 |
| WO | 2014000205 A1 | 1/2014 |

OTHER PUBLICATIONS

InterDigital Communications, "Mode Selection and Resource Pool Selection for D2D UEs", 3GPP TSG-RAN WG2 #85bis, Tdoc R2-141695, Mar. 22, 2014, 5 pages.

(Continued)

*Primary Examiner* — Anez C Ebrahim
(74) *Attorney, Agent, or Firm* — Lee Hong Degerman Kang & Waimey

(57) ABSTRACT

A method and apparatus for indicating a device-to-device (D2D) resource pool in a wireless communication system is provided. A user equipment (UE) selects one of a first D2D resource pool or a second D2D resource pool. The first D2D resource pool may be a preconfigured D2D resource pool, and the second D2D resource pool may be a D2D resource pool received from a cell. The UE transmits an indication of the selected D2D resource pool while performing a D2D operation based on the selected D2D resource pool.

4 Claims, 14 Drawing Sheets

(56) References Cited

U.S. PATENT DOCUMENTS

| | | | |
|---|---|---|---|
| 2014/0094183 A1 | 4/2014 | Gao et al. | |
| 2014/0162714 A1* | 6/2014 | Kim | H04W 8/005 455/509 |
| 2014/0274066 A1* | 9/2014 | Fodor | H04W 36/08 455/437 |
| 2016/0242144 A1* | 8/2016 | Adachi | H04W 76/14 |

OTHER PUBLICATIONS

LG Electronics Inc., "Resource pool usage upon entering coverage", 3GPP TSG-RAN WG2 #85bis, R2-141718, Mar. 22, 2014, 2 pages.

3rd Generation Partnership Project, "Technical Specification Group Services and System Aspects; Study on architecture enhancements to support Proximity-based Services (ProSe) (Release 12)", 3GPP TR 23.703 V1.0.0, Dec. 2013, 275 pages.

European patent application No. 15789353.8, European search report dated Nov. 16, 2017, 12 pages.

The State Intellectual Property Office of the People's Republic of China Application No. 201580023671.2, Office Action dated Nov. 20, 2018, 8 pages.

Intel Corporation, "Resource allocation signaling for D2D communication," 3GPP TSG RAN WG2 Meeting #85bis, R2-141223, Valencia, Spain, Mar. 31-Apr. 4, 2014, 6 pages.

LG Electronics Inc., "Operation in Mode 2 resource allocation for D2D communication," 3GPP TSG RAN WG1 Meeting #76bis, R1-141350, Shenzen, China, Mar. 31 to Apr. 4, 2014, 8 pages.

General Dynamics, "Resource Pool Configuration for D2D Communication," 3GPP TSG-RAN2 #85bis, R2-141609, Valencia, Spain, Mar. 31-Apr. 4, 2014, 7 pages.

The State Intellectual Property Office of the People's Republic of China Application No. 201580023671.2, Notice of Allowance dated Apr. 29, 2019, 4 pages.

Qualcomm Incorporated, "eNB resource allocation for D2D broadcast communication," 3GPP TSG-RAN WG2 #85 Bis, R2-141685, Valencia, Spain, Mar. 31-Apr. 4, 2014, 6 pages.

* cited by examiner

METHOD AND APPARATUS FOR INDICATING D2D RESOURCE POOL IN WIRELESS COMMUNICATION SYSTEM

CROSS-REFERENCE TO RELATED APPLICATIONS

This application is the National Stage filing under 35 U.S.C. 371 of International Application No. PCT/KR2015/004507, filed on May 6, 2015, which claims the benefit of U.S. Provisional Application No. 61/988,923, filed on May 6, 2014, the contents of which are all hereby incorporated by reference herein in their entirety.

BACKGROUND OF THE INVENTION

Field of the Invention

The present invention relates to wireless communications, and more particularly, to a method and apparatus for indicating a device-to-device (D2D) resource pool in a wireless communication system.

Related Art

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Recently, there has been a surge of interest in supporting proximity-based services (ProSe). Proximity is determined ("a user equipment (UE) is in proximity of another UE") when given proximity criteria are fulfilled. This new interest is motivated by several factors driven largely by social networking applications, and the crushing data demands on cellular spectrum, much of which is localized traffic, and the under-utilization of uplink frequency bands. 3GPP is targeting the availability of ProSe in LTE rel-12 to enable LTE become a competitive broadband communication technology for public safety networks, used by first responders. Due to the legacy issues and budget constraints, current public safety networks are still mainly based on obsolete 2G technologies while commercial networks are rapidly migrating to LTE. This evolution gap and the desire for enhanced services have led to global attempts to upgrade existing public safety networks. Compared to commercial networks, public safety networks have much more stringent service requirements (e.g., reliability and security) and also require direct communication, especially when cellular coverage fails or is not available. This essential direct mode feature is currently missing in LTE.

As a part of ProSe, device-to-device (D2D) operation between UEs has been discussed. For D2D operation, D2D resources needs to be defined. Accordingly, a method for indicating a D2D resource pool may be required.

SUMMARY OF THE INVENTION

The present invention provides a method and apparatus for indicating a device-to-device (D2D) resource pool in a wireless communication system. The present invention provides a method for transmitting a resource pool type indication (RPTI) for indicating a D2D resource pool used for D2D operation.

In an aspect, a method for indicating, by a user equipment (UE), a device-to-device (D2D) resource pool in a wireless communication system is provided. The method includes selecting one of a first D2D resource pool or a second D2D resource pool, and transmitting an indication of the selected D2D resource pool while performing a D2D operation based on the selected D2D resource pool.

In another aspect, a user equipment (UE) includes a memory, a transceiver, and a processor coupled to the memory and the transceiver, and configured to select one of a first D2D resource pool or a second D2D resource pool, and control the transceiver to transmit an indication of the selected D2D resource pool while performing a D2D operation based on the selected D2D resource pool.

A D2D resource pool can be indicated efficiently.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802-20, evolved UTRA (E-UTRA), etc. IEEE 802.16m is an evolution of IEEE 802.16e, and provides backward compatibility with an IEEE 802.16-based system. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in downlink and uses the SC-FDMA in uplink. LTE-advance (LTE-A) is an evolution of the 3GPP LTE.

For clarity, the following description will focus on the LTE-A. However, technical features of the present invention are not limited thereto.

Figure 1:
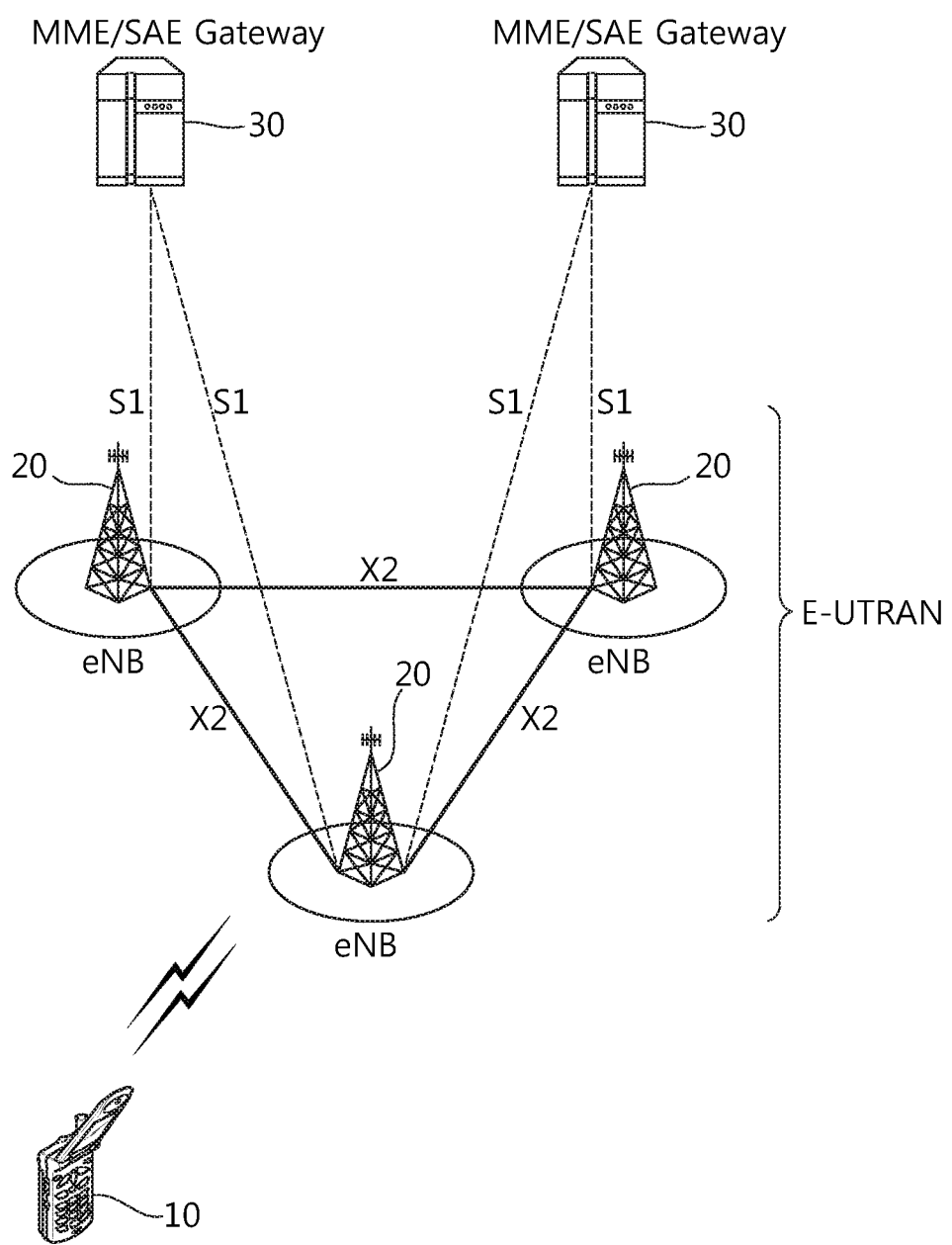
FIG. 1 shows LTE system architecture.

FIG. 1 shows LTE system architecture. The communication network is widely deployed to provide a variety of communication services such as voice over internet protocol (VoIP) through IMS and packet data.

Referring to FIG. 1, the LTE system architecture includes one or more user equipment (UE; 10), an evolved-UMTS terrestrial radio access network (E-UTRAN) and an evolved packet core (EPC). The UE 10 refers to a communication equipment carried by a user. The UE 10 may be fixed or mobile, and may be referred to as another terminology, such as a mobile station (MS), a user terminal (UT), a subscriber station (SS), a wireless device, etc.

The E-UTRAN includes one or more evolved node-B (eNB) 20, and a plurality of UEs may be located in one cell. The eNB 20 provides an end point of a control plane and a user plane to the UE 10. The eNB 20 is generally a fixed station that communicates with the UE 10 and may be referred to as another terminology, such as a base station (BS), an access point, etc. One eNB 20 may be deployed per cell.

Hereinafter, a downlink (DL) denotes communication from the eNB 20 to the UE 10, and an uplink (UL) denotes communication from the UE 10 to the eNB 20. In the DL, a transmitter may be a part of the eNB 20, and a receiver may be a part of the UE 10. In the UL, the transmitter may be a part of the UE 10, and the receiver may be a part of the eNB 20.

The EPC includes a mobility management entity (MME) and a system architecture evolution (SAE) gateway (S-GW). The MME/S-GW 30 may be positioned at the end of the network and connected to an external network. For clarity, MME/S-GW 30 will be referred to herein simply as a "gateway," but it is understood that this entity includes both the MME and S-GW.

The MME provides various functions including non-access stratum (NAS) signaling to eNBs 20, NAS signaling security, access stratum (AS) security control, inter core network (CN) node signaling for mobility between 3GPP access networks, idle mode UE reachability (including control and execution of paging retransmission), tracking area list management (for UE in idle and active mode), packet data network (PDN) gateway (P-GW) and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g., deep packet inspection), lawful interception, UE Internet protocol (IP) address allocation, transport level packet marking in the DL, UL and DL service level charging, gating and rate enforcement, DL rate enforcement based on access point name aggregate maximum bit rate (APN-AMBR).

Interfaces for transmitting user traffic or control traffic may be used. The UE 10 is connected to the eNB 20 via a Uu interface. The eNBs 20 are connected to each other via an X2 interface. Neighboring eNBs may have a meshed network structure that has the X2 interface. A plurality of nodes may be connected between the eNB 20 and the gateway 30 via an S1 interface.

Figure 2:
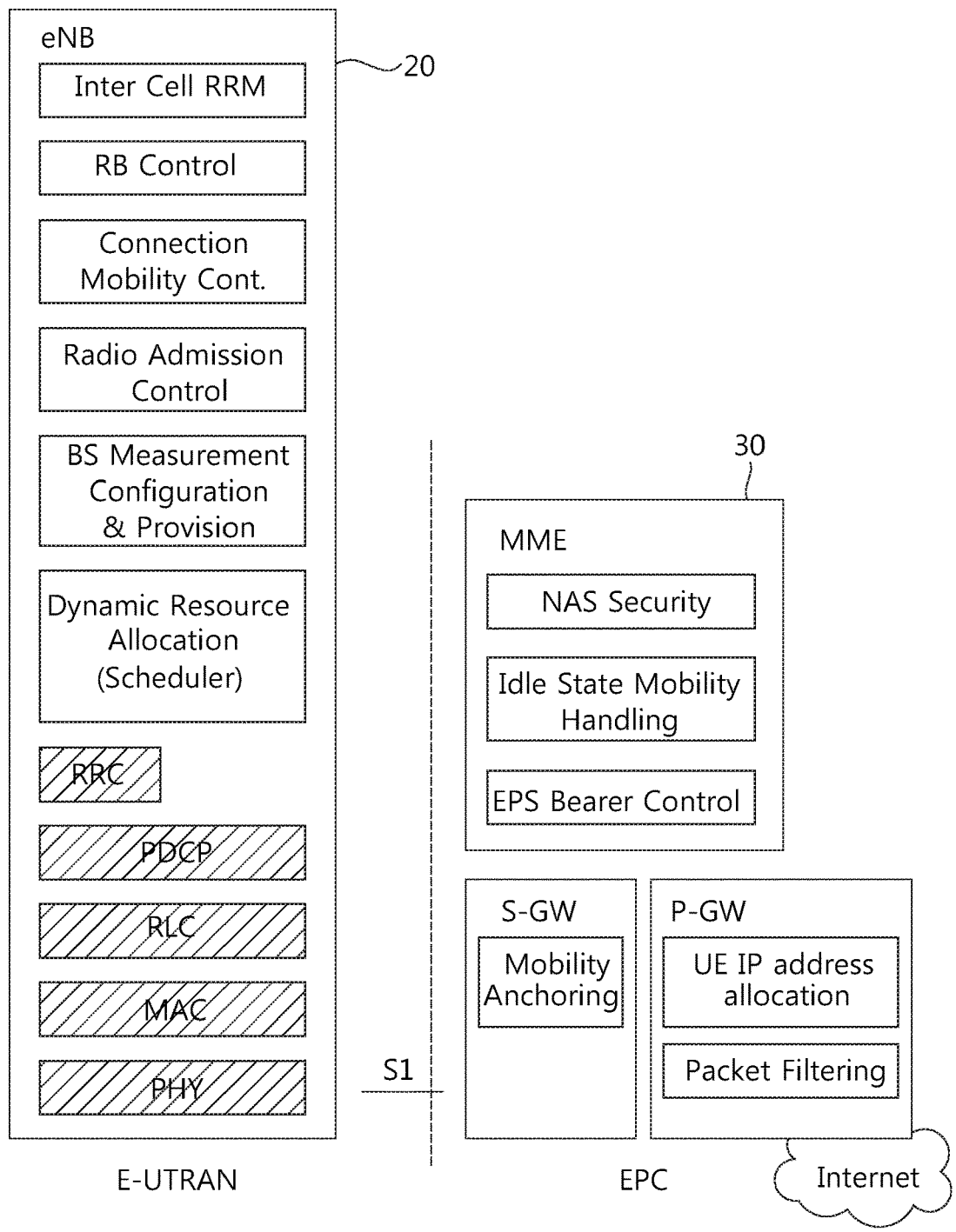
FIG. 2 shows a block diagram of architecture of a typical E-UTRAN and a typical EPC.

FIG. 2 shows a block diagram of architecture of a typical E-UTRAN and a typical EPC. Referring to FIG. 2, the eNB 20 may perform functions of selection for gateway 30, routing toward the gateway 30 during a radio resource control (RRC) activation, scheduling and transmitting of paging messages, scheduling and transmitting of broadcast channel (BCH) information, dynamic allocation of resources to the UEs 10 in both UL and DL, configuration and provisioning of eNB measurements, radio bearer control, radio admission control (RAC), and connection mobility control in LTE_ACTIVE state. In the EPC, and as noted above, gateway 30 may perform functions of paging origination, LTE_IDLE state management, ciphering of the user plane, SAE bearer control, and ciphering and integrity protection of NAS signaling.

Figure 3:
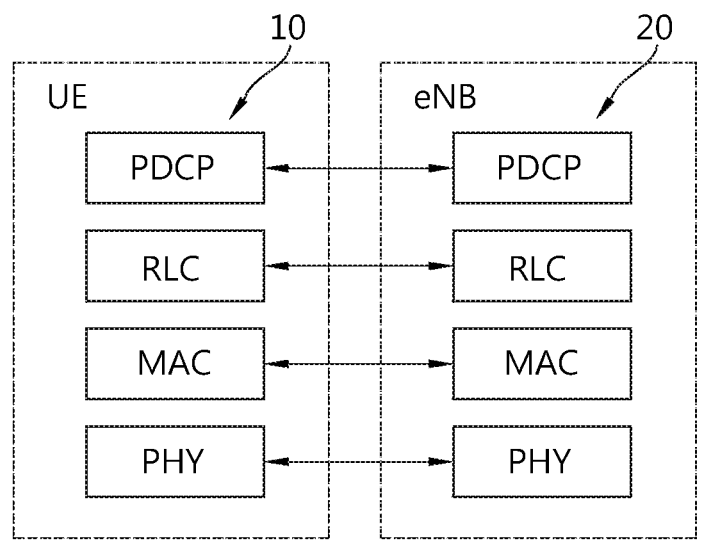
FIG. 3 shows a block diagram of a user plane protocol stack of an LTE system.
Figure 4:
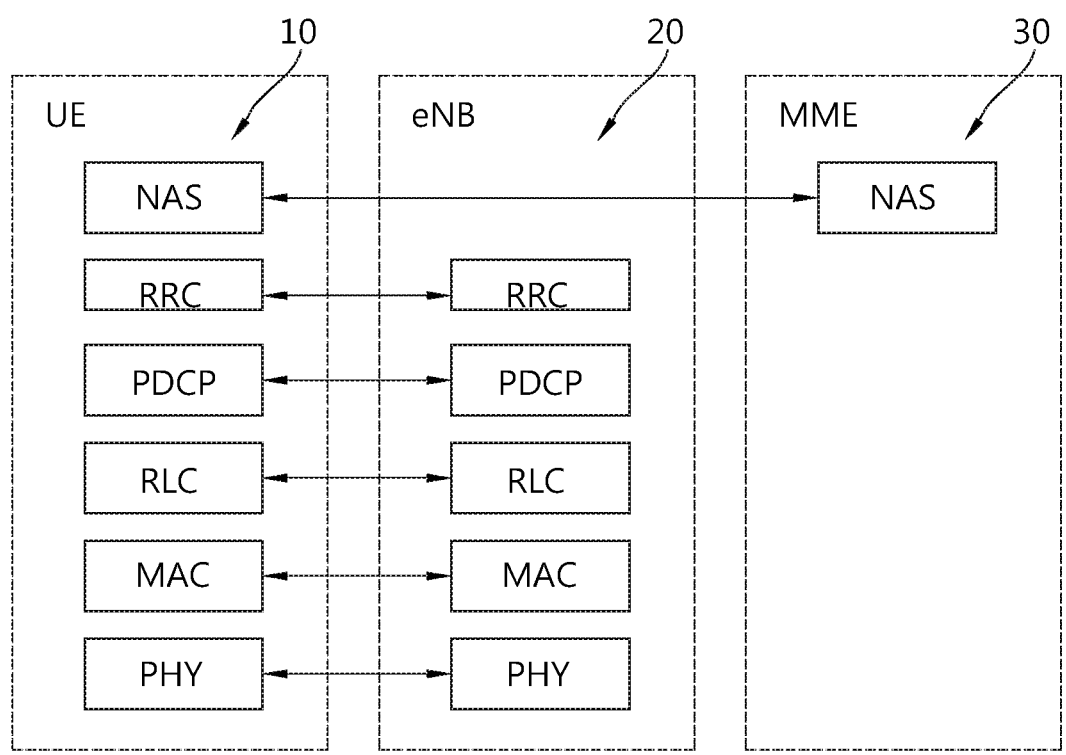
FIG. 4 shows a block diagram of a control plane protocol stack of an LTE system.

FIG. 3 shows a block diagram of a user plane protocol stack of an LTE system. FIG. 4 shows a block diagram of a control plane protocol stack of an LTE system. Layers of a radio interface protocol between the UE and the E-UTRAN may be classified into a first layer (L1), a second layer (L2), and a third layer (L3) based on the lower three layers of the open system interconnection (OSI) model that is well-known in the communication system.

A physical (PHY) layer belongs to the L1. The PHY layer provides a higher layer with an information transfer service through a physical channel. The PHY layer is connected to a medium access control (MAC) layer, which is a higher layer of the PHY layer, through a transport channel. A physical channel is mapped to the transport channel. Data between the MAC layer and the PHY layer is transferred through the transport channel. Between different PHY layers, i.e. between a PHY layer of a transmission side and a PHY layer of a reception side, data is transferred via the physical channel.

A MAC layer, a radio link control (RLC) layer, and a packet data convergence protocol (PDCP) layer belong to the L2. The MAC layer provides services to the RLC layer, which is a higher layer of the MAC layer, via a logical channel. The MAC layer provides data transfer services on logical channels. The RLC layer supports the transmission of data with reliability. Meanwhile, a function of the RLC layer may be implemented with a functional block inside the MAC layer. In this case, the RLC layer may not exist. The PDCP layer provides a function of header compression function that reduces unnecessary control information such that data being transmitted by employing IP packets, such as IPv4 or IPv6, can be efficiently transmitted over a radio interface that has a relatively small bandwidth.

A radio resource control (RRC) layer belongs to the L3. The RLC layer is located at the lowest portion of the L3, and is only defined in the control plane. The RRC layer controls logical channels, transport channels, and physical channels in relation to the configuration, reconfiguration, and release of radio bearers (RBs). The RB signifies a service provided the L2 for data transmission between the UE and E-UTRAN.

Referring to FIG. 3, the RLC and MAC layers (terminated in the eNB on the network side) may perform functions such as scheduling, automatic repeat request (ARQ), and hybrid ARQ (HARQ). The PDCP layer (terminated in the eNB on the network side) may perform the user plane functions such as header compression, integrity protection, and ciphering.

Referring to FIG. 4, the RLC and MAC layers (terminated in the eNB on the network side) may perform the same functions for the control plane. The RRC layer (terminated in the eNB on the network side) may perform functions such as broadcasting, paging, RRC connection management, RB control, mobility functions, and UE measurement reporting and controlling. The NAS control protocol (terminated in the MME of gateway on the network side) may perform functions such as a SAE bearer management, authentication, LTE_IDLE mobility handling, paging origination in LTE_IDLE, and security control for the signaling between the gateway and UE.

Figure 5:
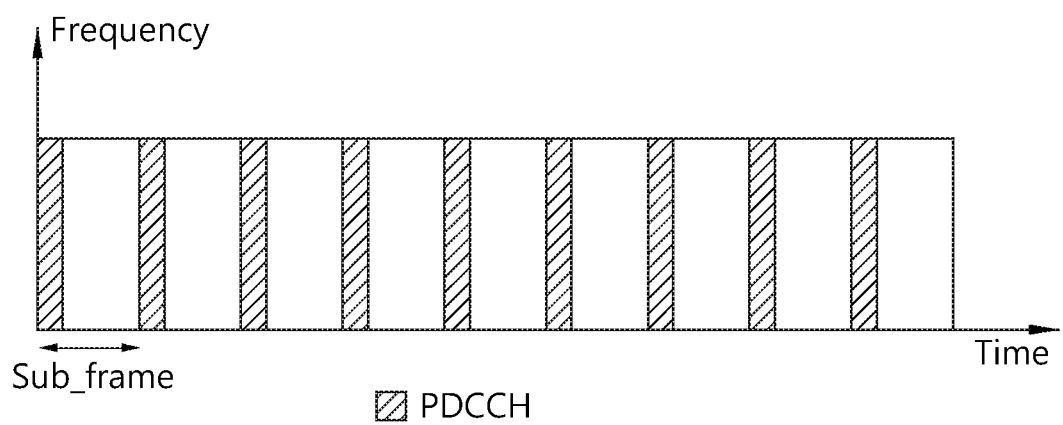
FIG. 5 shows an example of a physical channel structure.

FIG. 5 shows an example of a physical channel structure. A physical channel transfers signaling and data between PHY layer of the UE and eNB with a radio resource. A physical channel consists of a plurality of subframes in time domain and a plurality of subcarriers in frequency domain. One subframe, which is 1 ms, consists of a plurality of symbols in the time domain. Specific symbol(s) of the subframe, such as the first symbol of the subframe, may be used for a physical downlink control channel (PDCCH). The PDCCH carries dynamic allocated resources, such as a physical resource block (PRB) and modulation and coding scheme (MCS).

A DL transport channel includes a broadcast channel (BCH) used for transmitting system information, a paging channel (PCH) used for paging a UE, a downlink shared channel (DL-SCH) used for transmitting user traffic or control signals, a multicast channel (MCH) used for multicast or broadcast service transmission. The DL-SCH supports HARQ, dynamic link adaptation by varying the modulation, coding and transmit power, and both dynamic and semi-static resource allocation. The DL-SCH also may enable broadcast in the entire cell and the use of beamforming.

A UL transport channel includes a random access channel (RACH) normally used for initial access to a cell, a uplink shared channel (UL-SCH) for transmitting user traffic or control signals, etc. The UL-SCH supports HARQ and dynamic link adaptation by varying the transmit power and potentially modulation and coding. The UL-SCH also may enable the use of beamforming.

The logical channels are classified into control channels for transferring control plane information and traffic channels for transferring user plane information, according to a type of transmitted information. That is, a set of logical channel types is defined for different data transfer services offered by the MAC layer.

The control channels are used for transfer of control plane information only. The control channels provided by the MAC layer include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting multimedia broadcast multicast services (MBMS) control information from the network to a UE. The DCCH is a point-to-point bi-directional channel used by UEs having an RRC connection that transmits dedicated control information between a UE and the network.

Traffic channels are used for the transfer of user plane information only. The traffic channels provided by the MAC layer include a dedicated traffic channel (DTCH) and a multicast traffic channel (MTCH). The DTCH is a point-to-point channel, dedicated to one UE for the transfer of user information and can exist in both uplink and downlink. The MTCH is a point-to-multipoint downlink channel for transmitting traffic data from the network to the UE.

Uplink connections between logical channels and transport channels include the DCCH that can be mapped to the UL-SCH, the DTCH that can be mapped to the UL-SCH and the CCCH that can be mapped to the UL-SCH. Downlink connections between logical channels and transport channels include the BCCH that can be mapped to the BCH or DL-SCH, the PCCH that can be mapped to the PCH, the DCCH that can be mapped to the DL-SCH, and the DTCH that can be mapped to the DL-SCH, the MCCH that can be mapped to the MCH, and the MTCH that can be mapped to the MCH.

An RRC state indicates whether an RRC layer of the UE is logically connected to an RRC layer of the E-UTRAN. The RRC state may be divided into two different states such as an RRC idle state (RRC_IDLE) and an RRC connected state (RRC_CONNECTED). In RRC_IDLE, the UE may receive broadcasts of system information and paging information while the UE specifies a discontinuous reception (DRX) configured by NAS, and the UE has been allocated an identification (ID) which uniquely identifies the UE in a tracking area and may perform public land mobile network (PLMN) selection and cell re-selection. Also, in RRC_IDLE, no RRC context is stored in the eNB.

In RRC_CONNECTED, the UE has an E-UTRAN RRC connection and a context in the E-UTRAN, such that transmitting and/or receiving data to/from the eNB becomes possible. Also, the UE can report channel quality information and feedback information to the eNB. In RRC_CONNECTED, the E-UTRAN knows the cell to which the UE belongs. Therefore, the network can transmit and/or receive data to/from UE, the network can control mobility (handover and inter-radio access technologies (RAT) cell change order to GSM EDGE radio access network (GERAN) with network assisted cell change (NACC)) of the UE, and the network can perform cell measurements for a neighboring cell.

In RRC_IDLE, the UE specifies the paging DRX cycle. Specifically, the UE monitors a paging signal at a specific paging occasion of every UE specific paging DRX cycle. The paging occasion is a time interval during which a paging signal is transmitted. The UE has its own paging occasion. A paging message is transmitted over all cells belonging to the same tracking area. If the UE moves from one tracking area (TA) to another TA, the UE will send a tracking area update (TAU) message to the network to update its location.

Proximity-based services (ProSe) are described. It may be referred to 3GPP TR 23.703 V1.0.0 (2013-12). ProSe may be a concept including a device-to-device (D2D) communication. Hereinafter, "ProSe" may be used by being mixed with "D2D".

ProSe direct communication means a communication between two or more UEs in proximity that are ProSe-enabled, by means of user plane transmission using E-UTRA technology via a path not traversing any network node. ProSe-enabled UE means a UE that supports ProSe requirements and associated procedures. Unless explicitly stated otherwise, a ProSe-enabled UE refers both to a non-public safety UE and a public safety UE. ProSe-enabled public safety UE means a ProSe-enabled UE that also supports ProSe procedures and capabilities specific to public safety. ProSe-enabled non-public safety UE means a UE that supports ProSe procedures and but not capabilities specific to public safety. ProSe direct discovery means a procedure employed by a ProSe-enabled UE to discover other ProSe-enabled UEs in its vicinity by using only the capabilities of the two UEs with 3GPP LTE rel-12 technology. EPC-level ProSe discovery means a process by which the EPC determines the proximity of two ProSe-enabled UEs and informs them of their proximity. ProSe UE identity (ID) is a unique identity allocated by evolved packet system (EPS) which identifies the ProSe enabled UE. ProSe application ID is an identity identifying application related information for the ProSe enabled UE.

Figure 6:
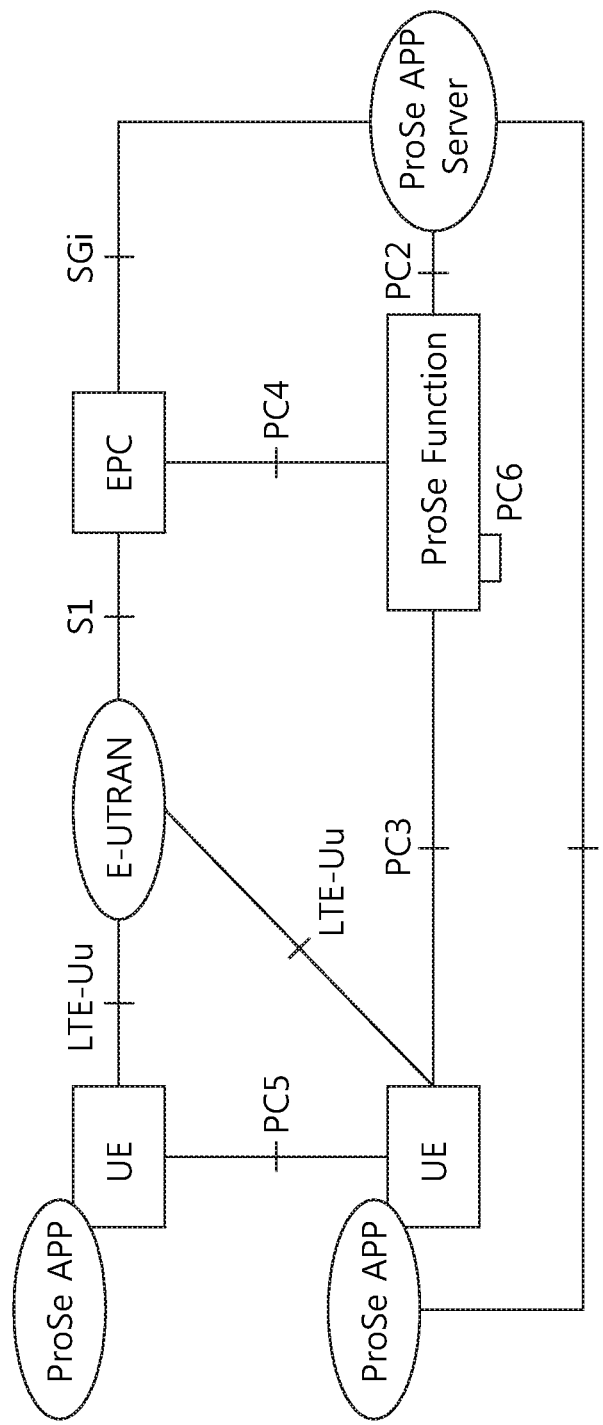
FIG. 6 shows reference architecture for ProSe.

FIG. 6 shows reference architecture for ProSe. Referring to FIG. 6, the reference architecture for ProSe includes E-UTRAN, EPC, a plurality of UEs having ProSe applications, ProSe application server, and ProSe function. The EPC represents the E-UTRAN core network architecture. The EPC includes entities such as MME, S-GW, P-GW, policy and charging rules function (PCRF), home subscriber server (HSS), etc. The ProSe application servers are users of the ProSe capability for building the application functionality. In the public safety cases, they can be specific agencies (PSAP), or in the commercial cases social media. These applications rare defined outside the 3GPP architecture but there may be reference points towards 3GPP entities. The application server can communicate towards an application in the UE. Applications in the UE use the ProSe capability for building the application functionality. Example may be for communication between members of public safety groups or for social media application that requests to find buddies in proximity.

The ProSe function in the network (as part of EPS) defined by 3GPP has a reference point towards the ProSe application server, towards the EPC and the UE. The functionality may include at least one of followings, but not be restricted thereto.

Interworking via a reference point towards the 3rd party applications

Authorization and configuration of the UE for discovery and direct communication Enable the functionality of the EPC level ProSe discovery ProSe related new subscriber data and handling of data storage, and also handling of ProSe identities Security related functionality Provide control towards the EPC for policy related functionality Provide functionality for charging (via or outside of EPC, e.g., offline charging)

Reference points/interfaces in the reference architecture for ProSe are described.

PC1: It is the reference point between the ProSe application in the UE and in the ProSe application server. It is used to define application level signaling requirements.

PC2: It is the reference point between the ProSe application server and the ProSe function. It is used to define the interaction between ProSe application server and ProSe functionality provided by the 3GPP EPS via ProSe function. One example may be for application data updates for a ProSe database in the ProSe function. Another example may be data for use by ProSe application server in interworking between 3GPP functionality and application data, e.g., name translation.

PC3: It is the reference point between the UE and ProSe function. It is used to define the interaction between UE and ProSe function. An example may be to use for configuration for ProSe discovery and communication.

PC4: It is the reference point between the EPC and ProSe function. It is used to define the interaction between EPC and ProSe function. Possible use cases may be when setting up a one-to-one communication path between UEs or when validating ProSe services (authorization) for session management or mobility management in real time.

PC5: It is the reference point between UE to UE used for control and user plane for discovery and communication, for relay and one-to-one communication (between UEs directly and between UEs over LTE-Uu).

PC6: This reference point may be used for functions such as ProSe discovery between users subscribed to different PLMNs.

SGi: In addition to the relevant functions via SGi, it may be used for application data and application level control information exchange.

Sidelink is UE to UE interface for ProSe direct communication and ProSe direct discovery. Sidelink comprises ProSe direct discovery and ProSe direct communication between UEs. Sidelink uses uplink resources and physical channel structure similar to uplink transmissions. Sidelink transmission uses the same basic transmission scheme as the UL transmission scheme. However, sidelink is limited to single cluster transmissions for all the sidelink physical channels. Further, sidelink uses a 1 symbol gap at the end of each sidelink sub-frame.

Figure 7:
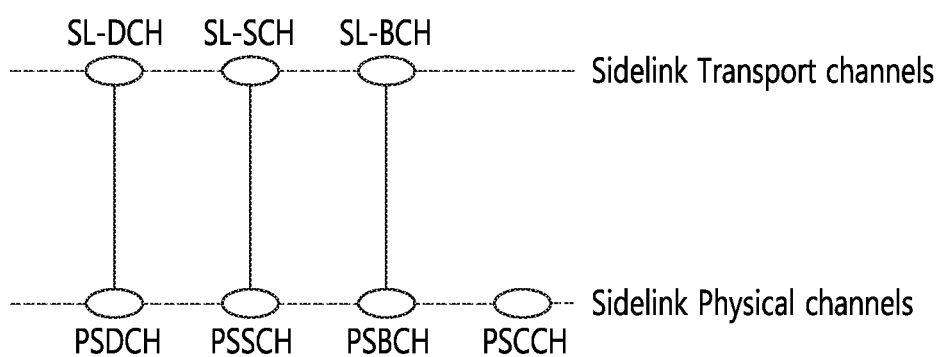
FIG. 7 shows an example of mapping between sidelink transport channels and sidelink physical channels.

FIG. 7 shows an example of mapping between sidelink transport channels and sidelink physical channels. Referring to FIG. 7, a physical sidelink discovery channel (PSDCH), which carries ProSe direct discovery message from the UE, may be mapped to a sidelink discovery channel (SL-DCH). The SL-DCH is characterized by:

fixed size, pre-defined format periodic broadcast transmission;

support for both UE autonomous resource selection and scheduled resource allocation by eNB;

collision risk due to support of UE autonomous resource selection; no collision when UE is allocated dedicated resources by the eNB.

A physical sidelink shared channel (PSSCH), which carries data from a UE for ProSe direct communication, may be mapped to a sidelink shared channel (SL-SCH). The SL-SCH is characterized by:

support for broadcast transmission;

support for both UE autonomous resource selection and scheduled resource allocation by eNB;

collision risk due to support of UE autonomous resource selection; no collision when UE is allocated dedicated resources by the eNB;

support for HARQ combining, but no support for HARQ feedback;

support for dynamic link adaptation by varying the transmit power, modulation and coding.

A physical sidelink broadcast channel (PSBCH), which carries system and synchronization related information transmitted from the UE, may be mapped to a sidelink broadcast channel (SL-BCH). The SL-BCH is characterized by pre-defined transport format. A physical sidelink control channel (PSCCH) carries control from a UE for ProSe direct communication.

Figure 8:
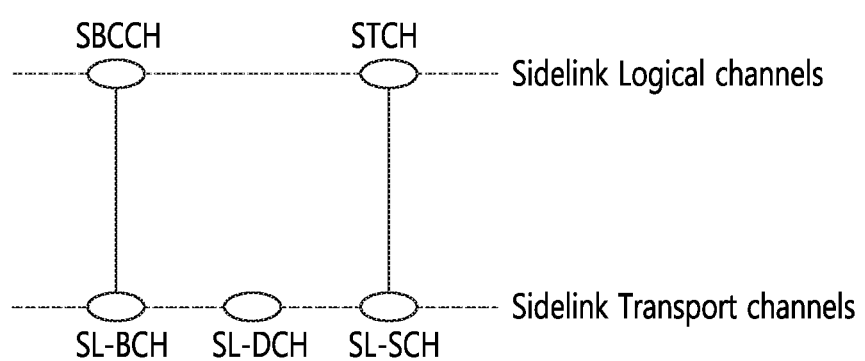
FIG. 8 shows an example of mapping between sidelink logical channels and sidelink transport channels for ProSe direct communication.

FIG. 8 shows an example of mapping between sidelink logical channels and sidelink transport channels for ProSe direct communication. Referring to FIG. 8, the SL-BCH may be mapped to a sidelink broadcast control channel (SBCCH), which is a sidelink channel for broadcasting sidelink system information from one UE to other UE(s). This channel is used only by ProSe direct communication capable UEs. The SL-SCH may be mapped to a sidelink traffic channel (STCH), which is a point-to-multipoint channel, for transfer of user information from one UE to other UEs. This channel is used only by ProSe direct communication capable UEs.

ProSe direct communication is a mode of communication whereby UEs can communicate with each other directly over the PC5 interface. This communication mode is supported when the UE is served by E-UTRAN and when the UE is outside of E-UTRA coverage. Only those UEs authorized to be used for public safety operation can perform ProSe direct communication. The UE performs Prose direct communication on subframes defined over the duration of sidelink control period. The sidelink control period is the period over which resources allocated in a cell for sidelink control and sidelink data transmissions occur. Within the sidelink control period the UE sends a sidelink control followed by data. Sidelink control indicates a layer 1 ID and characteristics of the transmissions (e.g. MCS, location of the resource(s) over the duration of sidelink control period, timing alignment).

For D2D communication, all UEs, in mode 1 and mode 2, may be provided with a resource pool (time and frequency) in which they attempt to receive scheduling assignments. The mode 1 indicates a scheduled mode in which an eNB or relay node (RN) schedules the exact resources used for D2D communication. The mode 2 indicates an autonomous mode in which a UE selects its own resources from a resource pool for D2D communication. In the mode 1, a UE may request transmission resources from an eNB. The eNB may schedule transmission resources for transmission of scheduling assignment(s) and data. The UE may send a scheduling request (dedicated SR (D-SR) or random access (RA)) to the eNB followed by a buffer status report (BSR) based on which the eNB can determine that the UE intends to perform a D2D transmission as well as the required amount resources. Further, in the mode 1, the UE may need to be in RRC_CONNECTED in order to transmit D2D communication. For the mode 2, UEs may be provided with a resource pool (time and frequency) from which they choose resources for transmitting D2D communication. The eNB may control whether the UE may apply the model or mode 2.

ProSe direct discovery is defined as the procedure used by the UE supporting direct discovery to discover other UE(s) in its proximity, using E-UTRA direct radio signals via PC5. ProSe direct discovery is supported only when the UE is served by E-UTRAN.

For D2D discovery, the eNB may provide in system information block (SIB) a radio resource pool for discovery transmission and reception for type 1 and a radio resource pool for discovery reception of type 2B. For the type 1, a UE may autonomously select radio resources from the indicated type 1 transmission resource pool for discovery signal transmission. For type 2B, only an RRC_CONNECTED UE may request resources for transmission of D2D discovery messages from the eNB via RRC. The eNB may assign resource via RRC. Radio resource may allocated by RRC as baseline. Receiving UEs may monitor both type 1 and type 2B discovery resources as authorized. In the UE, the RRC may inform the discovery resource pools to the MAC. The RRC may also inform allocated type 2B resource for transmission to the MAC.

Figure 9:
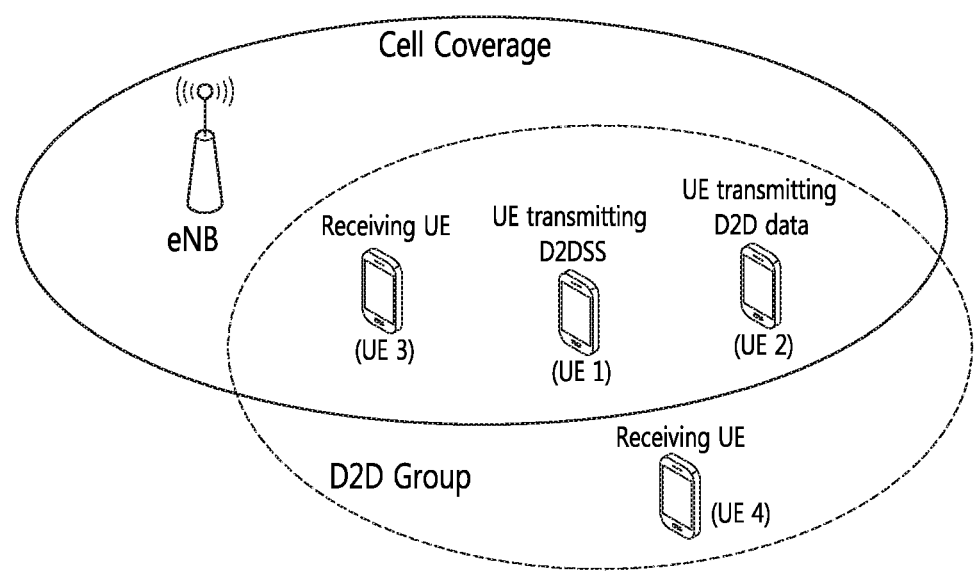
FIG. 9 shows an example of a group of UEs performing D2D communication and moving around the cell boundary.

FIG. 9 shows an example of a group of UEs performing D2D communication and moving around the cell boundary. Referring to FIG. 9, UE1 to UE4 consists of a D2D group. UE1 transmits a D2D synchronization signal (D2DSS). UE2 transmits a D2D data. UE3 and UE4 receive the D2D data. UE1 to UE3 are in the cell coverage. It is assumed that UE4 is the cell coverage firstly, but now, UE4 is out of the cell coverage. D2D resource pool for transmission and reception of D2D communication may be provided to UEs at a cell by e.g. SIB or dedicated signaling. Thus, a group of UEs transmitting or receiving D2D communication in the cell coverage maintain up-to-date system information carrying the D2D resource pool.

As described above, if some UEs, like UE4 in FIG. 9 above, in the D2D group leave/lose the cell coverage, preconfigured D2D resource pool, rather than the D2D resource pool provided by the cell, may be applied. Hence, UEs of the group in the cell coverage may transmit and receive D2D scheduling assignment (SA) based on the D2D resource pool provided by the cell, while UEs of the group out of the cell coverage may transmit and receive D2D SA based on the preconfigured D2D resource pool. That may cause UEs of the group to fail to receive the D2D SA, because when a UE out of the cell coverage may transmit D2D SA based on the preconfigured D2D resource pool while other UEs may monitor D2D SA based on the D2D resource pool provided by the cell.

In order to solve the problem described above, a method for indicating a D2D resource pool according to an embodiment of the present invention is described hereinafter.

Figure 10:
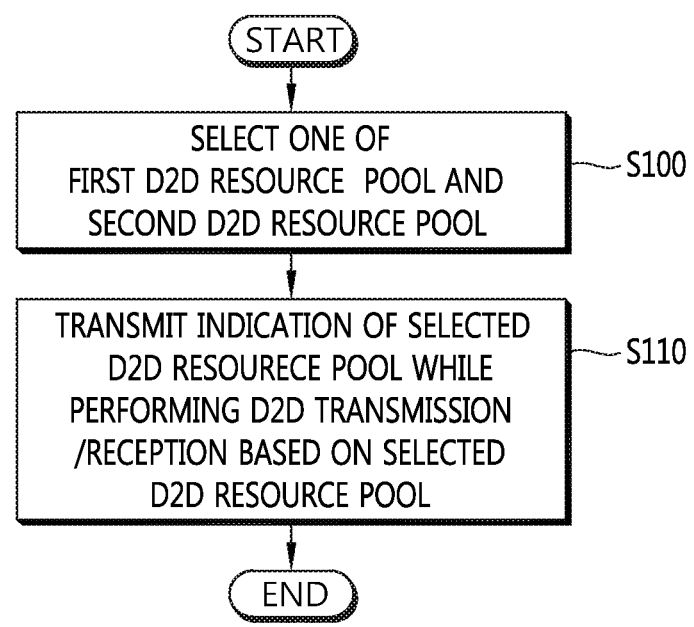
FIG. 10 shows an example of a method for indicating a D2D resource pool according to an embodiment of the present invention.

FIG. 10 shows an example of a method for indicating a D2D resource pool according to an embodiment of the present invention.

In step S100, the UE selects one of a first D2D resource pool or a second D2D resource pool. The first D2D resource pool may be a preconfigured D2D resource pool, and the second D2D resource pool may be a D2D resource pool received from a cell. That is, the first D2D resource pool may be the preconfigured D2D resource pool which is received via signaling of an upper layer than layer 2 (MAC/RLC/PDCP) and layer 3 (RRC), while the second D2D resource pool may be the D2D resource pool received from a cell, e.g. by SIB or by dedicated signaling. If the UE is out of the cell coverage or if valid D2D resource pool is not available in the UE, the first D2D resource pool, i.e. the preconfigured D2D resource pool, may be selected. If the UE is in the cell coverage or if valid D2D resource pool is available in the UE, the second D2D resource pool, i.e. the D2D resource pool received from a cell, may be selected, Alternatively, the first D2D resource pool may be directly received from a cell, while the second D2D resource pool may be received from another UE. In this case, the UE may select the first D2D resource pool received from the cell, between them. Alternatively, the first D2D resource pool may be received from a first UE, while the second D2D resource pool may be received from a second UE. If the UE is camping on a cell, the UE may select the same D2D resource pool received from the same cell between them. The UE may select an earlier received D2D resource pool between them or a recently received D2D resource pool between them.

In step S110, the UE transmits an indication of the selected D2D resource pool while performing a D2D operation based on the selected D2D resource pool. The D2D operation may include D2D communication and/or D2D discovery. Or, the D2D operation may include D2D transmission and/or D2D reception.

The indication may be a resource pool type indication (RPTI). The indication may indicate whether the first D2D resource pool or the second D2D resource pool is used for the D2D operation. More specifically, the indication may indicate whether or not the preconfigured D2D resource pool is used for ongoing D2D transmissions and/or upcoming D2D transmissions. The indication may indicate whether or not a D2D resource pool provided by a cell (e.g. by SIB or by dedicated signaling) is used for ongoing D2D transmissions and/or upcoming D2D transmissions. The indication may indicated whether the preconfigured D2D resource pool is used or a D2D resource pool provided by a cell (e.g. by SIB or by dedicated signaling) is used for ongoing D2D transmissions and/or upcoming D2D transmissions.

Further, the indication may additionally indicate further information. The indication may indicate from which cell the selected D2D resource pool is received. The indication may indicate on which frequency the selected D2D resource pool is received. The indication may indicate that the selected D2D resource pool is used for transmissions in D2D communication. The indication may indicate that the selected D2D resource pool is used for receptions in D2D communication. The indication may indicate that the selected D2D resource pool is used for transmissions in D2D discovery. The indication may indicate that the selected D2D resource pool is used for receptions in D2D discovery.

The indication may be periodically transmitted (possibly, during a certain time interval, e.g. several seconds).

The transmission of the indication may be initiated upon camping on a cell, upon leaving a cell, upon receiving a D2D resource pool (e.g. in system information) forwarded by another UE over D2D, upon receiving a D2D resource pool (e.g. in system information) from a cell or from the network, when the selected D2D resource pool becomes invalid, e.g. due to expiry of validity time, or when the selected D2D resource pool changes either from the first D2D resource pool to the second D2D resource pool or from the second D2D resource pool to the first D2D resource pool.

The indication may be transmitted along with a D2D resource pool received (e.g. in system information) from a cell or the network (e.g. for forwarding SIB to neighboring UEs), or an indication of whether the UE is in the cell coverage or out of the cell coverage.

Figure 11:
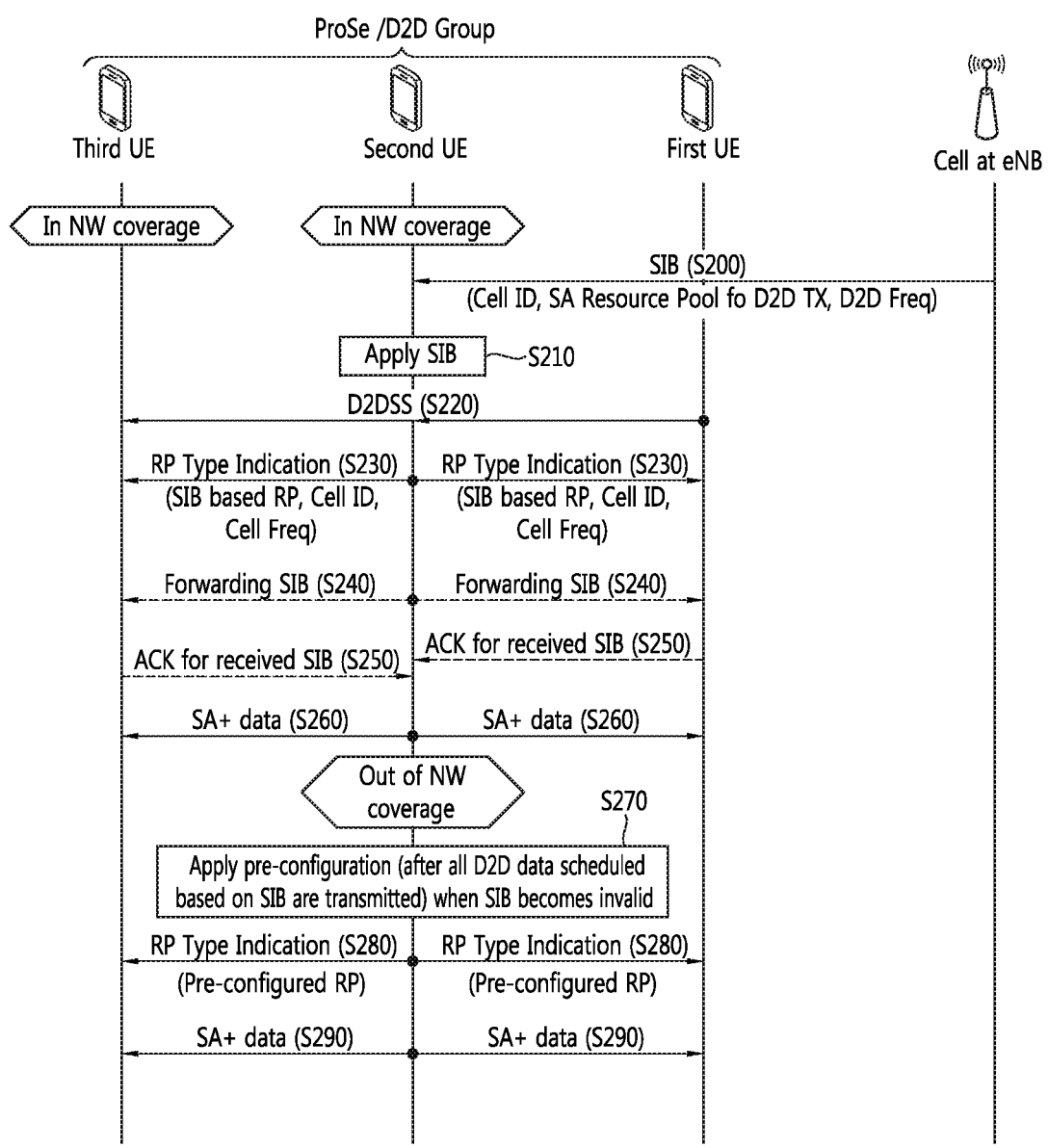
FIG. 11 shows an example of a method for indicating a D2D resource pool by a UE moving from in-cell coverage to out-of-cell coverage according to an embodiment of the present invention.

FIG. 11 shows an example of a method for indicating a D2D resource pool by a UE moving from in-cell coverage to out-of-cell coverage according to an embodiment of the present invention. In this embodiment, it is assumed that the UE has pre-configured SA resource pool for D2D transmission and D2D reception, e.g. via open mobile alliance (OMA) device management (DM), or signaling of an upper layer than access stratum. Further, it is assumed that a first UE is a UE transmitting the D2DSS, a second UE is a UE transmitting the D2D data, and a third UE is a UE receiving the D2D data. The first/second/third UEs consist of a D2D group.

In step S200, while a second UE is camping on a cell, the second UE receives system information and then acquires cell ID of the cell, SA resource pool for D2D TX/RX, and UL/DL frequency of the cell from the received system information. Alternatively, the UE may acquire cell ID of the cell, SA resource pool for D2D TX/RX, and UL/DL frequency of the cell by a dedicated signaling from the cell.

In step S210, the second UE selects the acquired SA resource pool for D2D TX/RX, and so the second UE applies the SA resource pool for D2D TX/RX. Since the second UE is in the cell-coverage, the second UE may select the D2D resource pool received from the cell.

In step S220, the first UE transmits the D2DSS. Accordingly, the second UE may synchronize to the D2DSS broadcast by the first UE.

In step S230, if the second UE transmits D2D data or D2DSS (e.g. if there is D2D data to be transmitted in its D2D buffer), the second UE transmits RPTI. The RPTI may indicate that the second UE uses D2D resource pool received from the cell (e.g. by SIB or by dedicated signaling) for ongoing D2D transmissions and/or upcoming D2D transmissions. The RPTI may also indicate from which cell the selected D2D resource pool is received, and/or on which frequency the selected D2D resource pool is received (e.g. UL/DL frequency of the cell).

In step S240, the second UE may forward system information (e.g. only including cell ID of the cell, SA resource pool for D2D TX/RX, and UL/DL frequency of the cell) to other UEs in the D2D group.

In step S250, if other UE successfully receive the forwarded system information, other UE transmits acknowledgement of the forwarded system information. The acknowledgement may be transmitted via, e.g. a RRC message, L2 control information such as MAC control element (CE), or L1 signaling in D2D SA. If the second UE receives the acknowledgement of the forwarded system information from all other UEs in the D2D group, the second UE may stop forwarding system information, assuming that second UE knows the number of UEs in the D2D group.

In step S260, the second UE transmits D2D SA according to the recently selected SA resource pool for D2D TX. And further, the second UE transmits D2D data according to D2D SA.

In step S270, if the second UE moves to out-of-cell coverage, when the received system information becomes invalid, e.g. after 3 hours, the second UE selects the pre-configured SA resource pool for D2D TX. Then, the second UE applies the pre-configured SA resource pool for D2D TX, after all D2D data scheduled by the SA based on the selected SA resource pool are successfully transmitted.

In step S280, when the second UE applies pre-configured SA resource pool for D2D TX, the second UE transmits RPTI indicating that the second UE uses pre-configured resource pool for ongoing D2D transmissions and/or upcoming D2D transmissions.

In step S290, the second UE transmits D2D SA according to the recently selected SA resource pool for D2D TX. And, the second UE transmits D2D data according to D2D SA.

Figure 12:
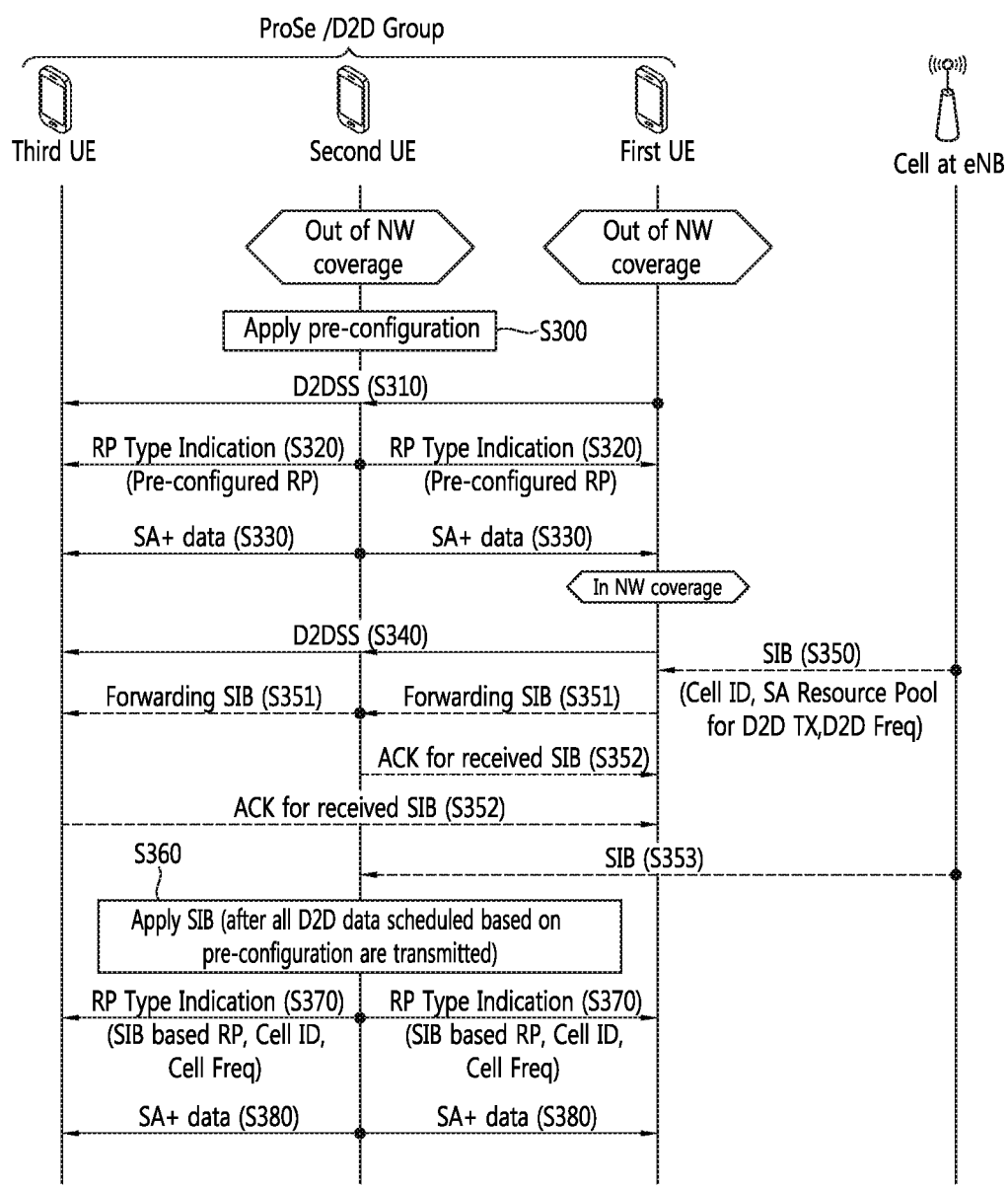
FIG. 12 shows an example of a method for indicating a D2D resource pool by a UE moving from out-of-cell coverage to in-cell coverage according to an embodiment of the present invention.

FIG. 12 shows an example of a method for indicating a D2D resource pool by a UE moving from out-of-cell coverage to in-cell coverage according to an embodiment of the present invention. In this embodiment, it is assumed that the UE has pre-configured SA resource pool for D2D transmission and D2D reception, e.g. via OMA DM, or signaling of an upper layer than access stratum. Further, it is assumed that a first UE is a UE transmitting the D2DSS, a second UE is a UE transmitting the D2D data, and a third UE is a UE receiving the D2D data. The first/second/third UEs consist of a D2D group.

In step S300, for D2D transmissions, while the second UE is out of the cell coverage, if there is no valid system information, the second UE selects the pre-configured SA resource pool for D2D TX. Then, the second UE applies the pre-configured SA resource pool for D2D TX (possibly, after all D2D data scheduled by the SA based on the selected SA resource pool are successfully transmitted).

In step S310, the first UE transmits the D2DSS. Accordingly, the second UE may synchronize to the D2DSS broadcast by the first UE.

In step S320, when the second UE applies the pre-configured SA resource pool for D2D TX, the second UE transmits RPTI indicating that the second UE uses the pre-configured resource pool for ongoing D2D transmissions and/or upcoming D2D transmissions.

In step S330, the second UE transmits D2D SA according to the recently selected SA resource pool for D2D TX. And, the second UE transmits D2D data according to D2D SA.

The first UE moves from out-of-cell coverage to in-cell coverage. In step S340, the first UE transmits the D2DSS. Upon moving from out-of-cell coverage to in-cell coverage, in step S350, the first UE may receive SIB including cell ID of the cell, SA resource pool for D2D TX/RX, and UL/DL frequency of the cell. In step S351, the first UE may forward the received SIB to other UEs in the D2D group. If the second UE successfully receives the forwarded SIB, in step S352, the second UE may transmit the acknowledgement of the received SIB.

Alternatively, the second UE may enter the cell coverage, and then, in step S353, the second UE may receive SIB including cell ID of the cell, SA resource pool for D2D TX/RX, and UL/DL frequency of the cell. The second UE may forward the received SIB to other UEs in the D2D group.

In step S360, the second UE selects the SA resource pool for D2D TX which is forwarded from another UE in the D2D group, in step S351 described above, or directly received from a cell, in step S353 described above. Then, the second UE applies the SA resource pool for D2D TX, after all D2D data scheduled based on pre-configured SA Resource Pool for D2D TX are successfully transmitted.

If the second UE transmits D2D data (e.g. if there is D2D data to be transmitted in its D2D buffer), in step S370, the second UE transmits RPTI. The RPTI may indicate that the second UE uses D2D resource pool received from the cell (e.g. by SIB, by dedicated signaling or by forwarding from another UE) for ongoing D2D transmissions and/or upcoming D2D transmissions. The RPTI may also indicate from which cell the selected D2D resource pool is received, and/or on which frequency the selected D2D resource pool is received (e.g. UL/DL frequency of the cell).

In step S380, the second UE transmits D2D SA according to the recently selected SA resource pool for D2D TX. And, the second UE transmits D2D data according to D2D SA.

Figure 13:
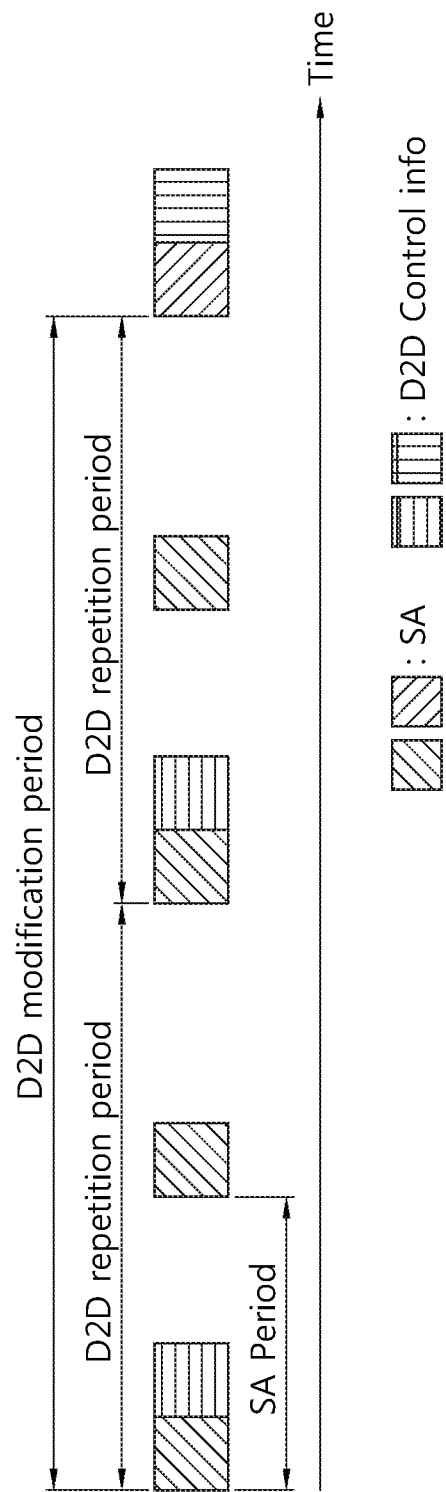
FIG. 13 shows an example of transmission of D2D control information according to an embodiment of the present invention.

FIG. 13 shows an example of transmission of D2D control information according to an embodiment of the present invention. D2D control information, such as a RPTI or forwarded SIB, etc., may be transmitted over direct interface between UEs. D2D control information may be repeated periodically according to the D2D repetition period. D2D control information may be transmitted from a UE transmitting D2DSS or a UE performing D2D transmission in D2D communication. D2D control information may change according to the D2D modification period. Namely, D2D control information may change only at the boundary of the D2D modification period. SA transmissions may occur periodically according to the SA period. SA may be re-transmitted in MAC or physical layer within one SA period. In FIG. 13, SA re-transmissions are not shown.

Figure 14:
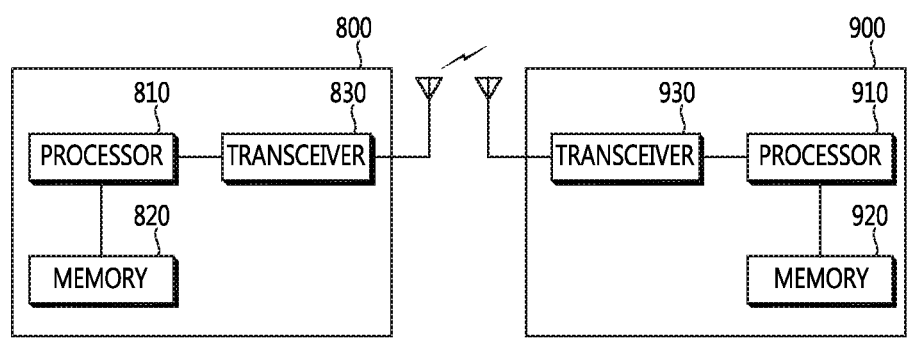
FIG. 14 shows a wireless communication system to implement an embodiment of the present invention.

FIG. 14 shows a wireless communication system to implement an embodiment of the present invention.

An eNB 800 may include a processor 810, a memory 820 and a transceiver 830. The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 810. The transceiver 830 is operatively coupled with the processor 810, and transmits and/or receives a radio signal.

A UE 900 may include a processor 910, a memory 920 and a transceiver 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The transceiver 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The transceivers 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What is claimed is:

1. A method for a first user equipment (UE) in a wireless communication system, the method comprising:
configuring a first device-to-device (D2D) resource pool, which is used out of a coverage of a cell;
receiving, from the cell, information on a second D2D resource pool, which is used in the coverage of the cell, wherein the second D2D resource pool is updated periodically;
selecting the second D2D resource pool while the first UE is located in the coverage of the cell;
transmitting D2D data to a second UE based on the second D2D resource pool, wherein the second UE is located in coverage of the cell;
upon moving out of the coverage of the cell, selecting the first D2D resource pool;

upon selecting the first D2D resource pool, transmitting a resource pool type indication (RPTI) via the second D2D resource pool to the second UE which is still located in coverage of the cell, wherein the RPTI indicates that upcoming D2D data will be transmitted on the first D2D resource pool; and transmitting the upcoming D2D data based on the first D2D resource pool to the second UE, wherein the RPTI further indicates a cell identity (ID) which informs from which cell the second D2D resource pool is received.

2. The method of claim 1, wherein the RPTI further indicates on which frequency the second D2D resource pool is received.

3. The method of claim 1, wherein the RPTI is transmitted periodically.

4. A user equipment (UE) comprising:
a memory;
a transceiver; and
a processor coupled to the memory and the transceiver, and configured to:
configure a first device-to-device (D2D) resource pool, which is used out of a coverage of a cell;
control the transceiver to receive, from the cell, information on a second D2D resource pool, which is used in the coverage of the cell, wherein the second D2D resource pool is updated periodically;
select the second D2D resource pool while the UE is located in the coverage of the cell;
control the transceiver to transmit D2D data to a second UE based on the second D2D resource pool, wherein the second UE is located in coverage of the cell;
upon moving out of the coverage of the cell, selecting the first D2D resource pool;
upon selecting the first D2D resource pool, control the transceiver to transmit a resource pool type indication (RPTI) via the second D2D resource pool to the second UE which is still located in coverage of the cell, wherein the RPTI indicates that upcoming D2D data will be transmitted on the first D2D resource pool; and
control the transceiver to transmit the upcoming D2D data based on the first D2D resource pool to the second UE,
wherein the RPTI further indicates a cell identity (ID) which informs from which cell the second D2D resource pool is received.

* * * * *